United States Patent
Staufer et al.

(10) Patent No.: US 12,212,961 B2
(45) Date of Patent: Jan. 28, 2025

(54) ENHANCED ONBOARDING IN CELLULAR COMMUNICATION NETWORKS

(71) Applicant: Nokia Technologies Oy, Espoo (FI)

(72) Inventors: Markus Staufer, Munich (DE); Bo Holm Bjerrum, Nibe (DK)

(73) Assignee: Nokia Technologies Oy, Espoo (FI)

( * ) Notice: Subject to any disclaimer, the term of this patent is extended or adjusted under 35 U.S.C. 154(b) by 401 days.

(21) Appl. No.: 17/674,640

(22) Filed: Feb. 17, 2022

(65) Prior Publication Data

US 2022/0264296 A1  Aug. 18, 2022

(30) Foreign Application Priority Data

Feb. 18, 2021  (FI) ...................................... 20215170

(51) Int. Cl.
*H04W 12/02* (2009.01)
*H04W 12/041* (2021.01)
*H04W 12/06* (2021.01)
*H04W 12/08* (2021.01)
*H04W 12/72* (2021.01)

(52) U.S. Cl.
CPC ........... *H04W 12/06* (2013.01); *H04W 12/02* (2013.01); *H04W 12/041* (2021.01); *H04W 12/08* (2013.01); *H04W 12/72* (2021.01)

(58) Field of Classification Search
CPC .............................. H04W 12/02; H04W 12/08
See application file for complete search history.

(56) References Cited

U.S. PATENT DOCUMENTS

| | | | | |
|---|---|---|---|---|
| 2020/0163013 | A1* | 5/2020 | Grayson | H04W 48/18 |
| 2020/0366794 | A1* | 11/2020 | Lee | H04W 60/00 |
| 2021/0112413 | A1* | 4/2021 | Pazhyannur | H04W 48/16 |
| 2022/0167167 | A1* | 5/2022 | Jost | H04W 12/75 |

FOREIGN PATENT DOCUMENTS

| | | |
|---|---|---|
| WO | 2018/065660 A1 | 4/2018 |
| WO | 2019/213946 A1 | 11/2019 |

OTHER PUBLICATIONS

"3rd Generation Partnership Project; Technical Specification Group Services and System Aspects; Study on enhanced security support for Non-Public Networks; (NPN); (Release 17)", 3GPP TR 33.857, V0.3.0, Nov. 2020, pp. 1-42.

(Continued)

*Primary Examiner* — David J Pearson
(74) *Attorney, Agent, or Firm* — Barta Jones, PLLC

(57) ABSTRACT

According to an example aspect of the present invention, there is provided an apparatus comprising at least one processing core, at least one memory including computer program code, the at least one memory and the computer program code being configured to, with the at least one processing core, cause the apparatus at least to transmit, by a user equipment, a concealed identifier of the user equipment to an onboarding network, wherein the concealed identifier of the user equipment indicates that the user equipment is requesting unauthenticated access to the onboarding network and execute, by the user equipment, a key generating authentication protocol to access the onboarding network without performing authentication of the user equipment.

20 Claims, 5 Drawing Sheets

(56) References Cited

OTHER PUBLICATIONS

"3rd Generation Partnership Project; Technical Specification Group Services and System Aspects; Study on enhanced support of non-public networks (Release 17)", 3GPP TR 23.700-07, V1.2.0, Nov. 2020, pp. 1-247.
Aboba et al., "Extensible Authentication Protocol (EAP)", RFC 3748, Network Working Group, Jun. 2004, pp. 1-67.
Simon et al., "The EAP-TLS Authentication Protocol", RFC 5216, Network Working Group, Mar. 2008, pp. 1-34.
"Add UNAUTH-TLS vendor specific EAP type", Archive. Today, Retrieved on Feb. 17, 2022, Webpage available at https://archive.vn/20130213070147/http:/hostap.epitest.fi/gitweb gitweb.cgi.
"HS 2.0R2: Add WFA Server-Only EAP-TLS Peer Method", Archive. Today, Retrieved on Feb. 17, 2022, Webpage available at https://archive.vn/20140930045346/http:/hostap.epitest.fi/gitweb/gitweb.cgi?p=hostap.git;a=commitdiff;h=8e5fdfabf69a7692d1a0d04f00fa103e9ff72010.
"3rd Generation Partnership Project; Technical Specification Group Services and System Aspects; System architecture for the 5G System (5GS); Stage 2 (Release 16)", 3GPP TS 23.501 V16.7.0, Dec. 2020, pp. 1-450.
Dekok, "The Network Access Identifier", RFC 7542, Internet Engineering Task Force (IETF), May 2015, pp. 1-30.
Office action received for corresponding Finnish Patent Application No. 20215170, dated Jul. 9, 2021, 10 pages.
"3rd Generation Partnership Project; Technical Specification Group Services and System Aspects; Study on enhanced security support for Non-Public Networks; (NPN); (Release 17)", 3GPP TR 33.857, V0.4.0 , Feb. 2021, pp. 1-63.
"3rd Generation Partnership Project; Technical Specification Group Services and System Aspects; 3GPP System Architecture Evolution (SAE); Security aspects of non-3GPP accesses (Release 16)", 3GPP TS 33.402, V16.0.0, Jul. 2020, pp. 1-72.
"3rd Generation Partnership Project; Technical Specification Group Services and System Aspects; Security architecture and procedures for 5G system (Release 17)", 3GPP TS 33.501, V17.0.0, Dec. 2020, pp. 1-253.
"3rd Generation Partnership Project; Technical Specification Group Core Network and Terminals; Numbering, addressing and identification; (Release 17)", 3GPP TS 23.003, V17.0.0 , Dec. 2020, pp. 1-142.
"Solution for providing secure onboarding without client authentication", 3GPP TSG-SA3 Meeting #102Bis-e, 83-211009, Agenda: 2.12, Nokia, Mar. 1-5, 2021, 3 pages.
Office action received for corresponding Finnish Patent Application No. 20215170, dated Dec. 21, 2021, 9 pages.

\* cited by examiner

ENHANCED ONBOARDING IN CELLULAR COMMUNICATION NETWORKS

FIELD

Various embodiments relate in general to cellular communication networks and more specifically, to onboarding in such networks.

BACKGROUND

Onboarding is a process by which a device may gain access to a network for the first time. Onboarding without a subscriber profile should be enabled in many cellular communication networks, such as in networks operating according to Long Term Evolution, LTE, and/or 5G radio access technology. 5G radio access technology may also be referred to as New Radio, NR, access technology. Since its inception, LTE has been widely deployed and 3rd Generation Partnership Project, 3GPP, still develops LTE. Similarly, 3GPP also develops standards for 5G/NR. In general, there is a need to provide improved methods, apparatuses and computer programs for onboarding in cellular communication networks.

SUMMARY

According to some aspects, there is provided the subject-matter of the independent claims. Some embodiments are defined in the dependent claims.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to an aspect of the present invention, there is provided an apparatus, comprising means for transmitting, by a user equipment, a concealed identifier of the user equipment to an onboarding network, wherein the concealed identifier of the user equipment indicates that the user equipment is requesting unauthenticated access to the onboarding network, and means for executing, by the user equipment, a key generating authentication protocol to access the onboarding network without performing authentication of the user equipment. The apparatus may be, or comprise, the user equipment, or a control device configured to control the functioning thereof, possibly when installed therein.

According to an aspect of the present invention, there is provided an apparatus, comprising means for receiving, by an authentication server function of a network, a concealed identifier of a user equipment, wherein the concealed identifier of the user equipment indicates that the user equipment is requesting unauthenticated access to the network, the network being an onboarding network for the user equipment, and means for executing, by the authentication server function, a key generating authentication protocol with the user equipment without performing authentication of the user equipment. The apparatus may be, or comprise, the authentication server function, or a control device configured to control the functioning thereof, possibly when installed therein.

According to an aspect of the present invention, there is provided a first method, comprising transmitting, by a user equipment, a concealed identifier of the user equipment to an onboarding network, wherein the concealed identifier of the user equipment indicates that the user equipment is requesting unauthenticated access to the onboarding network, and executing, by the user equipment, a key generating authentication protocol to access the onboarding network without performing authentication of the user equipment. The first method may be performed by the user equipment, or a control device configured to control the functioning thereof, possibly when installed therein.

According to an aspect of the present invention, there is provided a second method, comprising receiving, by an authentication server function of a network, a concealed identifier of a user equipment, wherein the concealed identifier of the user equipment indicates that the user equipment is requesting unauthenticated access to the network, the network being an onboarding network for the user equipment, and executing, by the authentication server function, a key generating authentication protocol with the user equipment without performing authentication of the user equipment. The second method may be performed by the authentication server function, or a control device configured to control the functioning thereof, possibly when installed therein.

According to an aspect of the present invention, there is provided an apparatus comprising at least one processing core, at least one memory including computer program code, the at least one memory and the computer program code being configured to, with the at least one processing core, cause the apparatus at least to perform, transmit, by a user equipment, a concealed identifier of the user equipment to an onboarding network, wherein the concealed identifier of the user equipment indicates that the user equipment is requesting unauthenticated access to the onboarding network, and execute, by the user equipment, a key generating authentication protocol to access the onboarding network without performing authentication of the user equipment. The apparatus may be, or comprise, the user equipment, or a control device configured to control the functioning thereof, possibly when installed therein.

According to an aspect of the present invention, there is provided an apparatus comprising at least one processing core, at least one memory including computer program code, the at least one memory and the computer program code being configured to, with the at least one processing core, cause the apparatus at least to perform, receive, by an authentication server function of a network, a concealed identifier of a user equipment, wherein the concealed identifier of the user equipment indicates that the user equipment is requesting unauthenticated access to the network, the network being an onboarding network for the user equipment, and execute, by the authentication server function, a key generating authentication protocol with the user equipment without performing authentication of the user equipment. The apparatus may be, or comprise, the authentication server function, or a control device configured to control the functioning thereof, possibly when installed therein.

According to an aspect of the present invention, there is provided a non-transitory computer readable medium having stored thereon a set of computer readable instructions that, when executed by at least one processor, cause an apparatus to at least perform the first or the second method. According to an aspect of the present invention, there is provided a computer program comprising instructions which, when the program is executed by an apparatus, cause the apparatus to carry out the first or the second method.

EMBODIMENTS

Onboarding may be improved by the procedures described herein. More specifically, onboarding may be improved by enabling unauthenticated access to an onboarding network without using default credentials and default credential servers. A User Equipment, UE, may use a concealed identifier, such as a Subscriber Concealed Identity, SUCI, to indicate to the onboarding network that the UE requests unauthenticated access. That is, the concealed identifier of the UE may be constructed such that it may be determined, at the onboarding network, from the concealed identifier that the UE is asking for unauthenticated access. Hence, an authentication server function of a network may execute, upon receiving the concealed identifier, a key generating authentication protocol with the user equipment without performing authentication of the user equipment.

Figure 1:
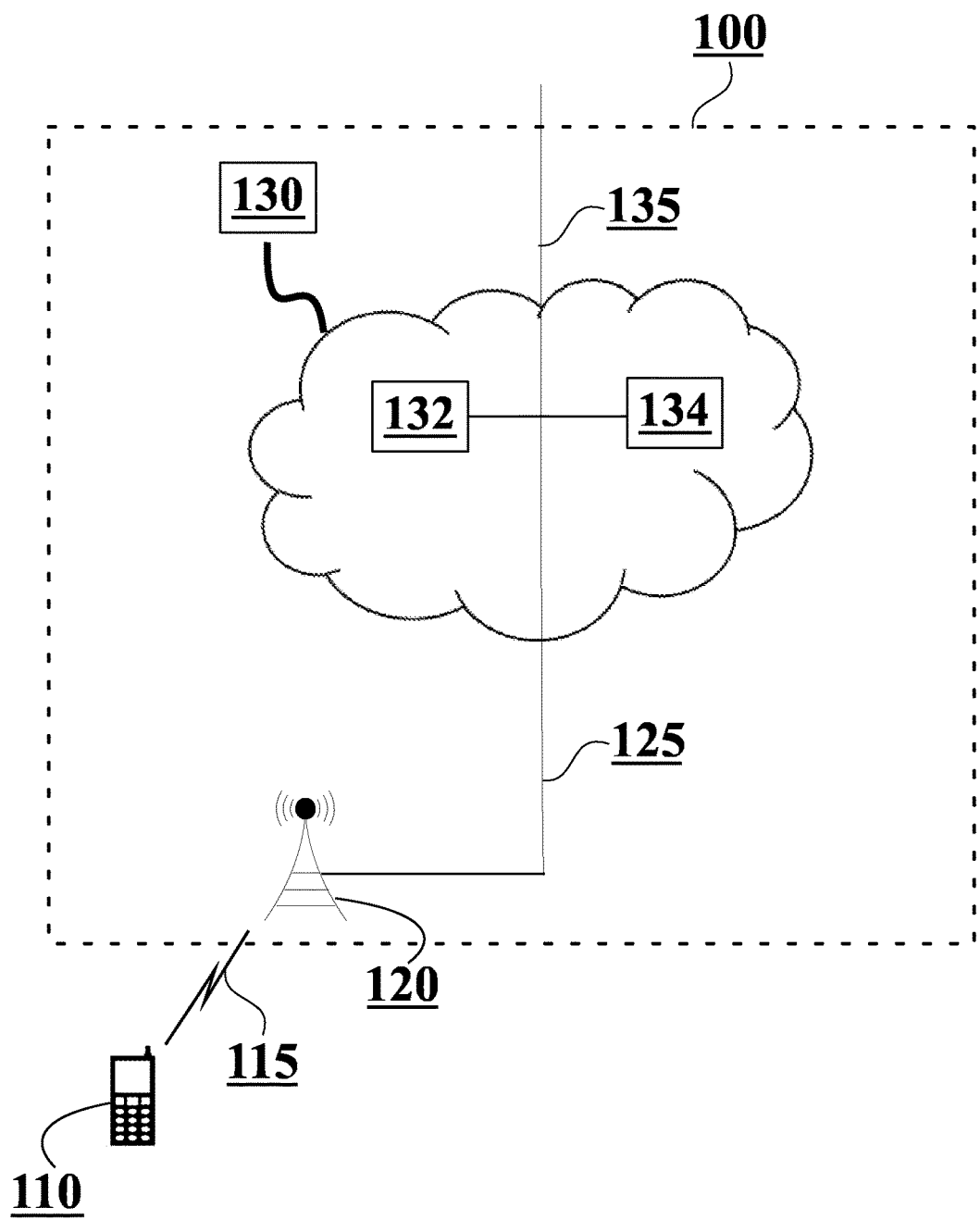
FIG. 1 illustrates an example of a communication system in accordance with at least some embodiments.

FIG. 1 illustrates an example of a communication system in accordance with at least some embodiments. In FIG. 1, cellular communication network 100, such as a Public Land Mobile Network, PLMN, is shown. Network 100 may be referred to as an onboarding network and UE 110 may be referred to as an onboarding UE, as UE 110 may wish to access network 100 without a subscription profile. Network 100 may comprise at least Base Station, BS, 120, and core network 130.

UE 110 may comprise, for example, a smartphone, a cellular phone, a Machine-to-Machine, M2M, node, Machine-Type Communications, MTC, node, an Internet of Things, IoT, node, a car telemetry unit, a laptop computer, a tablet computer or, indeed, any kind of suitable mobile wireless terminal or station. Air interface 115 between UE 110 and BS 120 may be configured in accordance with a cellular Radio Access Technology, RAT, which UE 110 and BS 120 are configured to support. More specifically, UE 110 and BS 120 may communicate wirelessly in accordance with at least one standard defined by the $3^{rd}$ Generation Partnership Project, 3GPP. That is, UE 110 and BS 120 may be configured to operate according to the at least one 3GPP standard.

Examples of cellular RATs include Long Term Evolution, LTE, New Radio, NR, which may also be known as fifth generation, 5G, radio access technology and MulteFire. For instance, in the context of LTE, BS 120 may be referred to as eNB while in the context of NR, BS 120 may be referred to as gNB. In any case, embodiments of the present invention are not restricted to any particular cellular communication technology. Instead, embodiments may be exploited in any cellular communication network wherein onboarding is enabled.

BS 120 may also be connected, directly or via at least one intermediate node, with core network 130 via wired interface 125. Core network 130 may be, in turn, coupled via wired interface 135 with another network (not shown in FIG. 1), via which connectivity to further networks may be obtained, for example via a worldwide interconnection network. BS 120 and core network 130 may form onboarding network 100 for UE 110.

Core network 130 may be equipped with at least one NF. An NF may refer to an operational and/or a physical entity. An NF may be a specific network node or element, or a specific function or set of functions carried out by one or more entities, such as Virtual Network Functions, VNFs. One physical apparatus may be configured to perform tasks of multiple NFs. Examples of such network functions include a (radio) access or resource control or management function, session management or control function, interworking, data management or storage function, authentication function or a combination of one or more of these functions.

In case of a 3GPP Service-Based Architecture, SBA, of 5G core networks, NFs may comprise at least some of an Access and Mobility Function, AMF, a Session Management Function, SMF, a Unified Data Manager, UDM, a Security Anchor Function, SEAF, and an Authentication Server Function, AUSF. For instance, the SEAF may hold a root key, also known as an anchor key, of a network. The SEAF may be collocated with an AMF for example The SEAF may be a single anchor per PLMN for all access networks. On the other hand, the AUSF may derive and store a key calculated after authentication for reuse. In FIG. 1, the SEAF of onboarding network 100 is denoted by 132 while the AUSF of onboarding network 100 is denoted by 134. SEAF 132 and AUSF 134 may be configured to operate according to at least one 3GPP standard as well. Presence of, e.g., the UDM in onboarding network 100 is not mandatory because UE 110 does not have a subscription and therefore, there is also no record in the UDM.

In case of onboarding, one issue is that a subscriber profile may only be remotely provisioned to UE 110 if connectivity between UE 110 and a provisioning server (not shown in FIG. 1) is available. However, in such a case UE 110 would not be able to access to onboarding network 100 if a connection between UE 110 and the provisioning server is not available, i.e., without having the valid subscriber profile. A mechanism is therefore needed to enable access to onboarding network 100 even if there would be no connection between UE 110 and the provision server. That is to say, the challenge is how UE 110 can access onboarding network 100 without having the valid subscriber profile for accessing the network.

Default credentials and default credential servers may be used to provide access to onboarding network 100 for UE 110. UE 110 may receive, or be configured with, default credentials during manufacturing. An entity issuing said default credentials may be a default credential server, which is used during onboarding to authenticate UE 110. UE 110 may execute for example 5G primary authentication, in which UE 110 may act as an Extensible Authentication Protocol, EAP, Client (also known as supplicant), the default credential server may act as an EAP Server and the onboarding network may act as an EAP Authenticator. For instance, EAP Transport Layer Security, EAP-TLS, may be used for this purpose. The default credentials may consist of a private key and a corresponding certificate, which can be verified by the default credential server. However, in such a case an integration between onboarding network 100 and the default credentials server would be required. The EAP is defined by the IETF in RFC 3748 and the EAP-TLS protocol is defined by the IETF in RFC 5216.

Embodiments of the present invention therefore make it possible for UE 110 to access onboarding network 100 without a need for default credentials or integration with a default credential server. At the same time, for instance the 5G key hierarchy may be fully preserved. In accordance with at least some embodiments of the present invention, an authentication protocol may be executed by onboarding network 100 and UE 110 without performing authentication of UE 110. In general, the authentication protocol may be referred to as a key generating authentication protocol.

The executed authentication protocol, i.e., the key generating authentication protocol, may be a protocol, which is derived for example from EAP-TLS, but does not include the authentication of the UE. Such protocols comprise at least variants of the EAP-TLS like EAP UNAUTH-TLS and EAP WFA-UNAUTH-TLS. These variants of the EAP-TLS protocol make it possible for UE 110 to access the network without authenticating itself. For EAP UNAUTH-TLS, see https://archive.vn/20130213070147/http:/hostap.epitest.fi/gitweb/gitweb.cgi?p=hostap.git;a=commit;h =065d2895b4693e8c923580dbfa31123297c8bb7d (retrieved on Dec. 2, 2021), and for WFA-UNAUTH-TLS, see https://archive.vn/20140930045346/http:/hostap.epitest.fi/gitweb/gitweb.cgi (retrieved on Dec. 2, 2021), respectively. Although these variants of EAP-TLS do not include authentication of the client, they result in a master secret, which may be shared between a client and a server, such as UE 110 and onboarding network 100, respectively. The master secret may then be used as a basis for further secret communication between the client and the server. These variants are given as examples but in general any other suitable protocol with similar functionality may be used.

According to at least some embodiments of the present invention, a concealed identifier, such as a SUCI, of UE 110 may be used to indicate to onboarding network 100 that UE 110 would like to access onboarding network 100 without performing authentication of UE 110. The concealed identifier of UE 110 may be constructed in such a way that it may be determined from the concealed identifier that UE 110 is asking for unauthenticated access.

In some embodiments, at least one security key of a cellular communication system, such as a $K_{AUSF}$ of 5G key hierarchy, may be calculated based on a MSK, or alternatively EMSK, because the EAP-TLS variants, which do not include client authentication, may still generate Master Session Key, MSK, and Extended MSK, EMSK keys. Alternatively, or in addition, at least one security key of the cellular communication system, such as $K_{AMF}$, may be calculated using a string reserved for unauthenticated access instead of a permanent identifier, such as a Subscriber Permanent Identifier, SUPI, of UE 110. So a well-known string may be used as an input instead of a UE-specific SUPI, i.e., the SUPI may be replaced by the reserved string.

After the execution of the authentication protocol, UE 110 may establish a restricted Protocol Data Unit, PDU, session. The restricted PDU session may be used to provision subscriber profiles to UE 110.

Embodiments of the present invention therefore make it possible for UE 110 to access an onboarding network 100 without having a subscriber profile or any other kind of identifiers or credentials, but still executing an authentication protocol without authenticating UE 110. The full key hierarchy of the cellular communication system, like 5G system, may be preserved as well.

Figure 2:
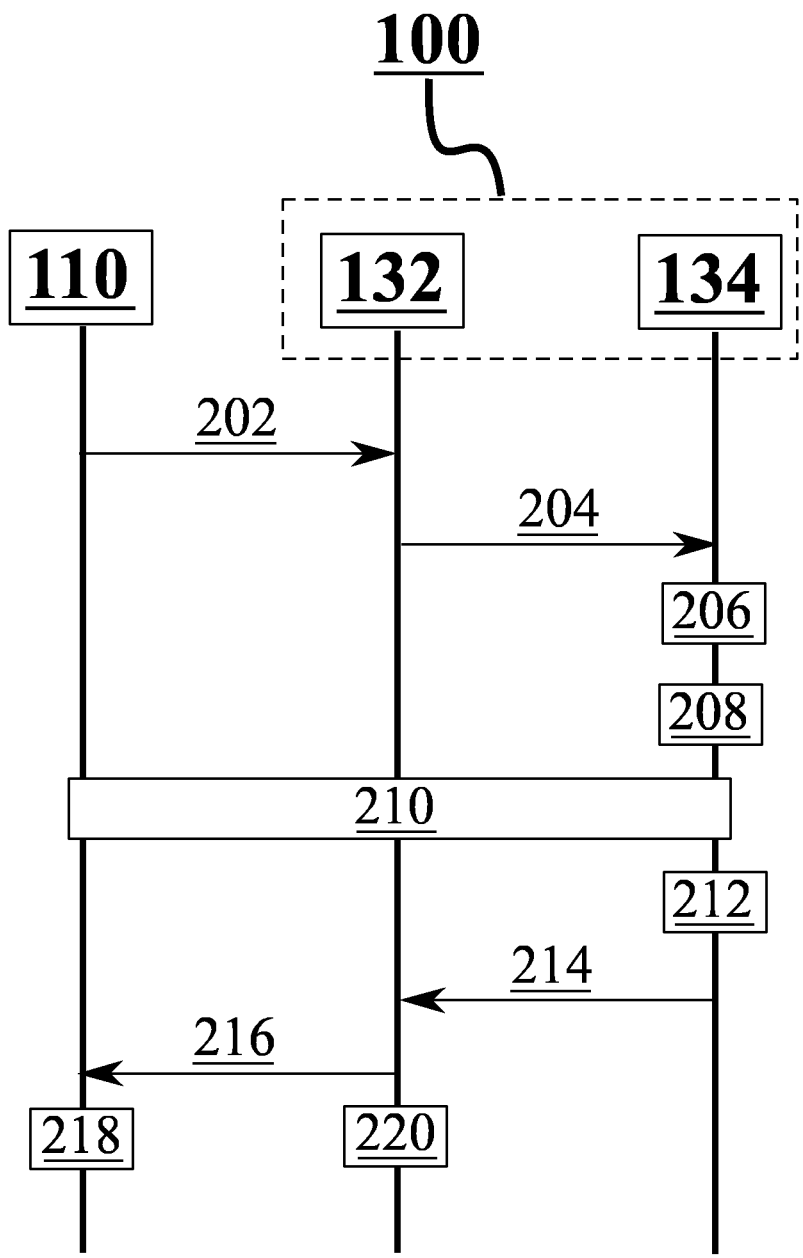
FIG. 2 illustrates a signalling graph in accordance with at least some embodiments.

FIG. 2 illustrates a signalling graph in accordance with at least some embodiments. With reference to FIG. 1, on the vertical axes are disposed, from the left to the right, UE 110, SEAF 132 and AUSF 134. Time advances from the top towards the bottom.

At step 202, UE 110 may transmit the concealed identifier of UE 110 to onboarding network 100, wherein the concealed identifier of UE 110 may indicate that UE 110 is requesting unauthenticated access to onboarding network 100. UE 110 may transmit the concealed identifier in a registration request to SEAF 132 for example. UE 110 may construct the concealed identifier such that it is usable for determining that unauthenticated access to onboarding network 100 is requested by UE 110.

The concealed identifier of UE 110 may be constructed in various ways to indicate that unauthenticated access is requested. For instance, at least the following ways are possible:

a) UE 110 may set a type of a permanent identifier, such as a SUPI, in the concealed identifier as a Network Specific Identifier, NSI, and a Home Network Identifier, HNI, in the concealed identifier as a string reserved for unauthenticated access. The SUPI may be in the Network Address Identifier, NAI, format as specified in RFC 7542. Thus, there may be two terms with identical meaning because the SUPI type in the SUCI may be referred to as NSI according to 3GPP TS 23.003 as well. The HNI may be set to a well-known reserved string, like "anonymous". In some embodiments, the well-known reserved string may be a string value which is defined in a standard, such as a 3GPP standard. The SUCI's scheme input and output may be left empty. In general, a SUCI may be only partly encrypted. The HNI may not be encrypted, because it may be used for routing purposes. The part of the SUCI, which is encrypted, may be called as the scheme output. The scheme output may be generated from the scheme input by applying encryption using a public key of the home network (i.e., only the home network can decrypt using private key). There may be a special case of "Null scheme", meaning that no encryption is applied, e.g., the input scheme is identical to the output scheme. In some embodiments, the null scheme may be applied. The SUPI type in the SUCI may describe how the SUCI needs to be interpreted. If the SUPI Type is IMSI, the HNI is a MNC/MCC combination. If the SUPI type is NSI, the HNI may be a realm (i.e., a string), which in general may identify the home network of UE 110. As onboarding UE 110 does not have a subscription (and thus no home network), the HNI may be set to the reserved string;

b) Alternatively, the HNI in the concealed identifier may be set by UE 110 as an identifier of onboarding network 100 and a scheme output is set as the string reserved for unauthenticated access. For instance, if the type of the permanent identifier of the concealed identifier is International Mobile Subscriber Identity, IMSI, the scheme output may be a reserved Mobile Subscription Identification Number, MSIN, such as a number consisting of zeros. On the other hand, if the permanent identifier of the concealed identifier is a Network Specific Identifier, NSI, the scheme input may be a username, i.e., a string, which may be set to "anonymous" or any other string value, reserved for this purpose. The null scheme may be used to protect the scheme output (i.e., no protection is applied). If the null scheme is used, the scheme input would be the same as the scheme output;

c) As another option, a new type of the permanent identifier may be used, which can be selected in the concealed identifier. For instance, UE 110 may set the type of the permanent identifier in the concealed identifier to a new value, like a bit value which has a meaning of a new SUPI type, reserved for unauthenticated access, such as a SUPI Type "Anonymous".

In case of options a) and b), AUSF 134 or an UDM (not shown in FIG. 2) may select the authentication protocol which does not require authentication, such as an unauthenticated EAP method, based on whether the string reserved for unauthenticated access is present in the concealed identifier, either in the HNI in the concealed identifier or in the scheme output of the concealed identifier. In option c) AUSF 134 or the UDM may select the authentication protocol which does not require authentication based on a new type of the permanent identifier.

At step 204, SEAF 132 may transmit a UE authorization request comprising the concealed identifier of UE 110 to AUSF 134. Step 204 may be performed, e.g., as defined in 3GPP TS 33.501. Upon receiving the concealed identifier AUSF 134 may, at step 206, determine based on the concealed identifier that unauthenticated access to onboarding network 100 is requested.

At step 208, AUSF 134 may select, based on said determination, the authentication protocol which does not require authentication of UE 110 for onboarding of UE 110. That is to say, when the concealed identifier of UE 110 indicates that unauthenticated access is requested, AUSF 134 may select the authentication protocol which does not require authentication, such as a modified EAP-TLS method. The selected protocol may be for example EAP UNAUTH-TLS or EAP WFA-UNAUTH-TLS or any other suitable protocol with similar functionality. Alternatively, when the concealed identifier of UE 110 does not indicate that unauthenticated access is requested, AUSF 134 may select an authentication protocol which requires authentication, such as a regular EAP-TLS method. The selection of authentication protocol may be carried out by AUSF 134 or AUSF 134 may invoke the UDM for the selection.

At step 210, the authentication protocol may be executed by UE 110 and AUSF 134 for enabling access of UE 110 to onboarding network 100 without performing authentication of UE 110. For instance, the authentication protocol may be executed as described in 3GPP TS 33.501 for EAP-TLS except that the selected modified EAP-TLS method is used instead of EAP-TLS.

At step 212, AUSF 134 may calculate at least one security key of a cellular communication system. For instance, before the last step of the EAP procedure AUSF 134 may calculate $K_{AUSF}$ and $K_{SEAF}$ as defined in 3GPP TS 33.501. That is, a Master Session Key, MSK, or Extended MSK, EMSK, resulting from the executed EAP session may be used as an input for the derivation of $K_{AUSF}$.

At step 214, AUSF 134 may transmit an authentication response to SEAF 132. The authentication response may comprise a permanent identifier, such as the SUPI, of UE 110. The permanent identifier of UE 110 in the authentication response may be set as a string reserved for unauthenticated access to indicate that UE 110 has not been authenticated. The permanent identifier may be set to a predefined constant value for example. In some embodiments, the authentication response transmitted by AUSF 134 may comprise an EAP Success message, $K_{SEAF}$ and SUPI.

Hence, UE 110 may not need to prove its identity to onboarding network 100. In cellular communication systems, such as 5G systems, a UE identity may be a necessary identifier for service calls though. More importantly, a management NF, such as an AMF or a SMF, may use the permanent identifier, such as the SUPI, of UE 110 during calls for context management, session management, and subscriber data management services provided to the UDM. In some embodiments, registration, session management, and subscriber data management may not be executed during onboarding of UE 110. Therefore, assignment of the permanent identifier may not be necessary for accessing services of the UDM.

For example, if the management NF needs the permanent identifier of UE 110 for internal purposes, it may temporarily allocate such an identifier. More specifically, SEAF 132 and AUSF 134 may determine the permanent identifier of UE 110 in connection with step 214. The permanent identifier of UE 110 may then be released after UE 110 has deregistered.

In some embodiments, the permanent identifier, transmitted from AUSF 134 to SEAF 132 at step 214, may not be a constant value. Instead, the temporary identifier may be a temporary SUPI, which is not known to UE 110. The temporary SUPI may be assigned by AUSF 134 or the UDM. Before transmitting the temporary SUPI, a temporary subscriber data record may be created for the temporary SUPI by the UDM using, e.g., a subscriber data profile intended for onboarding UEs. The UDM may offer context management, session management and subscriber data management services for the temporary SUPI. The temporary subscriber data profile record may be removed after the temporary SUPI has been deregistered.

As UE 110 may not be aware of the temporary SUPI, calculation of at least one security key of the cellular communication system, like $K_{AMF}$, may be based on using a string reserved for unauthenticated access instead of the permanent identifier of UE 110. That is, a constant value may be used instead of the temporary SUPI. In some embodiments, AUSF 134 may indicate to SEAF 132 that the string reserved for unauthenticated access should be used instead of the permanent identifier of UE 110. For instance, the message transmitted from AUSF 134 to SEAF 132, at step 214, may comprise a flag indicating that the constant value is to be used instead of the temporary SUPI of UE 110, e.g., for calculation of $K_{AMF}$ and remaining 5G keys by SEAF 132.

In some embodiments, the temporary SUPI may be generated by UE 110 in a format of a NSI. UE 110 may generate the temporary SUPI prior to step 202 for example. A realm part of the SUPI may be set to "anonymous" or any other similar well-defined string and a username may be chosen by UE 110, e.g., in the form of a random string. The HNI of the concealed identifier of UE 110, transmitted from UE 110 to onboarding network 110 at step 202, may comprise the realm of the temporary SUPI, whereas a scheme input may be the username of the temporary SUPI. The temporary subscriber data record for the temporary SUPI may be used by the UDM, and UE 110 and the AMF may use the temporary SUPI for the derivation of $K_{AMF}$.

At step 216, SEAF 132 may transmit a success response to UE 110. For instance, the success response may be transmitted as defined in 3GPP TS 33.501.

At step 218, UE 110 may calculate the at least one security key, such as $K_{AMF}$, of the cellular communication system using the string reserved for unauthenticated access, for example instead of the permanent identifier of UE 110. Similarly, SEAF 132 may, at step 220, calculate the at least one security key, such as $K_{AMF}$, of the cellular communication system using the string reserved for unauthenticated access, for example instead of the permanent identifier of UE 110.

Figure 3:
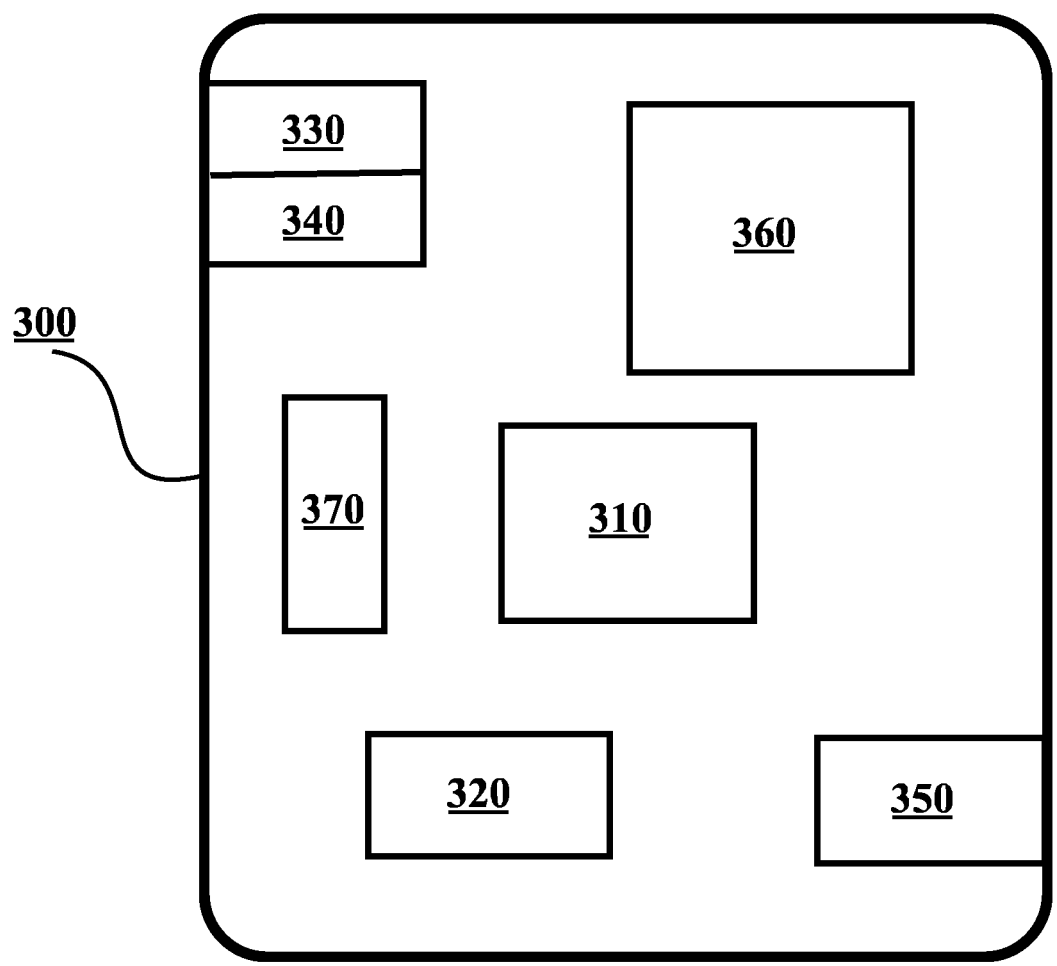
FIG. 3 illustrates an example apparatus capable of supporting at least some embodiments.

FIG. 3 illustrates an apparatus capable of supporting at least some example embodiments. Illustrated is device 300, which may comprise, for example, UE 110, SEAF 132 or AUSF 134, or a device controlling functioning thereof. Comprised in device 300 is processor 310, which may comprise, for example, a single-or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one Application-Specific Integrated Circuit, ASIC. Processor 310 may comprise at least one Field-Programmable Gate Array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Global System for Mobile communication, GSM, Wideband Code Division Multiple Access, WCDMA, 5G, Long Term Evolution, LTE, IS-95, Wireless Local Area Network, WLAN, Ethernet and/or Worldwide Interoperability for Microwave Access, WiMAX, standards, for example.

Device 300 may comprise a Near-Field Communication, NFC, transceiver 350. NFC transceiver 350 may support at least one NFC technology, such as Bluetooth, Wibree or similar technologies.

Device 300 may comprise User Interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a Subscriber Identity Module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some example embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the example embodiment various ways of interconnecting at least two of the aforementioned devices may be selected without departing from the scope of the example embodiments.

Figure 4:
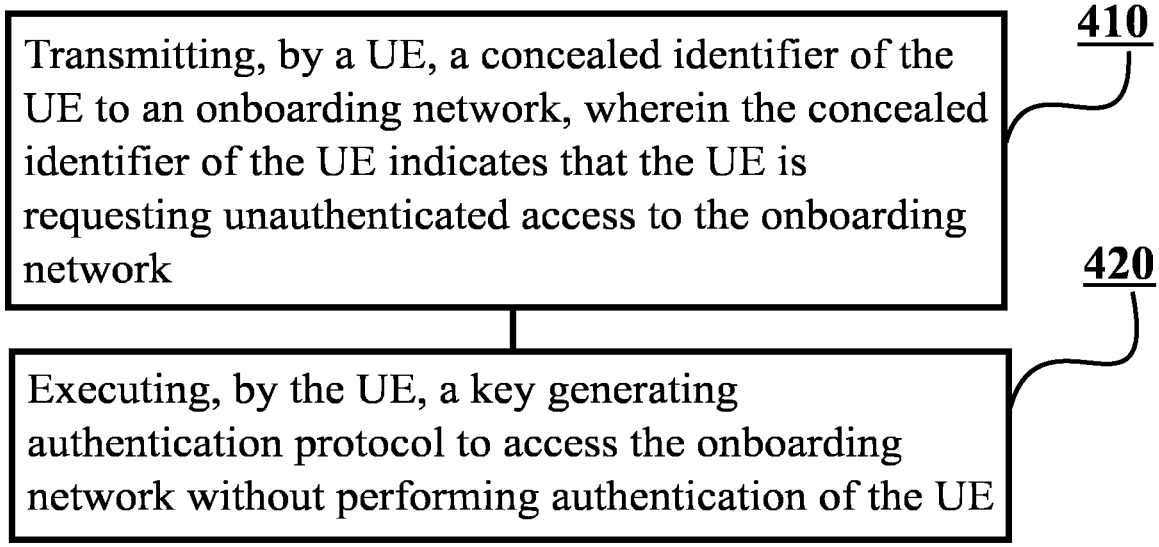
FIG. 4 illustrates a flow graph of a first method in accordance with at least some embodiments.

FIG. 4 is a flow graph of a first method in accordance with at least some embodiments. The phases of the illustrated first method may be performed by UE 110 or a device controlling functioning thereof, possibly when installed therein.

The first method may comprise, at step 410, transmitting, by a user equipment, a concealed identifier of the user equipment to an onboarding network, wherein the concealed identifier of the user equipment indicates that the user equipment is requesting unauthenticated access to the onboarding network. The first method may also comprise, at step 420, executing, by the user equipment, a key generating authentication protocol to access the onboarding network without performing authentication of the user equipment.

Figure 5:
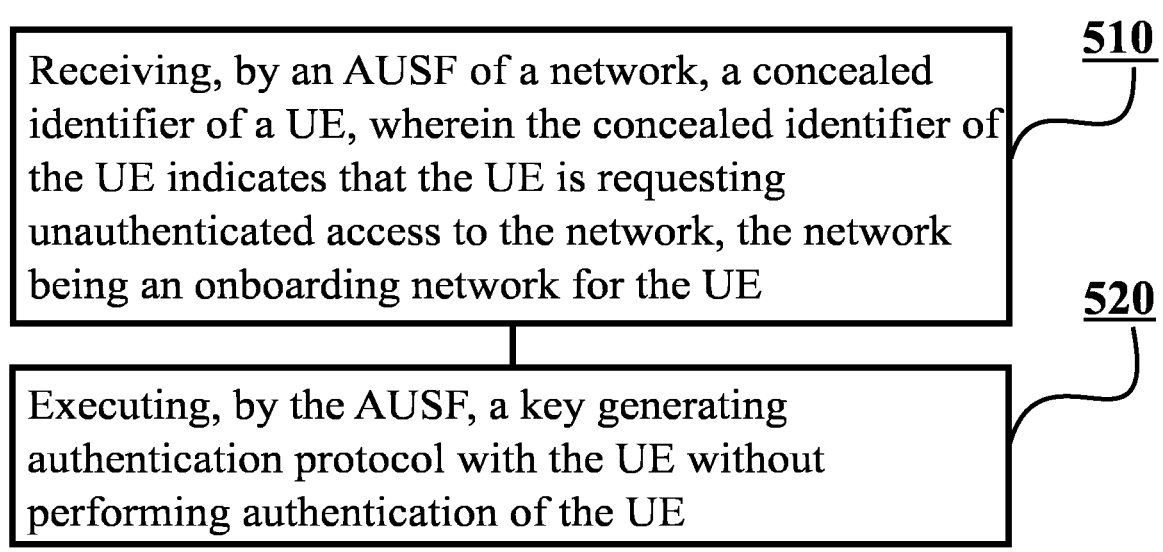
FIG. 5 illustrates a flow graph of a second method in accordance with at least some embodiments.

FIG. 5 is a flow graph of a second method in accordance with at least some embodiments. The phases of the illustrated second method may be performed by AUSF 134 or a device controlling functioning thereof, possibly when installed therein.

The second method may comprise, at step 510, receiving, by an authentication server function of a network, a concealed identifier of a user equipment, wherein the concealed identifier of the user equipment indicates that the user equipment is requesting unauthenticated access to the network, the network being an onboarding network for the user equipment. The second method may also comprise, at step 520, executing, by the authentication server function, a key generating authentication protocol with the user equipment without performing authentication of the user equipment.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an embodiment, an apparatus, comprising for example UE 110, SEAF 132 or AUSF 134, may further comprise means for carrying out the embodiments described above and any combination thereof. The apparatus may be an apparatus of a cellular communication network, such as a 5G network, and comprise means for operating in the cellular communication network.

In an embodiment, a computer program comprising instructions which, when the program is executed by a computer, cause the computer to carry out a method in accordance with the embodiments described above and any combination thereof. In an embodiment, a computer program product, embodied on a non-transitory computer readable medium, may be configured to control a processor to perform a process comprising the embodiments described above and any combination thereof.

In an embodiment, an apparatus, comprising for example UE 110, SEAF 132 or AUSF 134, may further comprise at least one processor, and at least one memory including computer program code, wherein the at least one memory and the computer program code are configured to, with the at least one processor, cause the apparatus at least to perform the embodiments described above and any combination thereof. The apparatus may be an apparatus of a cellular communication network, such as a 5G network, and configured to operate in the cellular communication network.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The expression "at least one of A or B" in this document means A, or B, or both A and B.

INDUSTRIAL APPLICABILITY

At least some embodiments find industrial application in cellular communication networks, such as 5G networks, and possibly in other cellular communication networks in the future, such as 6G networks, as well.

ACRONYMS LIST

3GPP 3rd Generation Partnership Project
ASIC Application-Specific Integrated Circuit
AUSF Authentication Server Function
BS Base Station
EAP Extensible Authentication Protocol
EMSK Extended MSK
FPGA Field-Programmable Gate Array
GSM Global System for Mobile communication
HNI Home Network Identifier
IANA Internet Assigned Numbers Authority
IMSI International Mobile Subscriber Identity
IoT Internet of Things
LTE Long-Term Evolution
M2M Machine-to-Machine
MSIN Mobile Subscription Identification Number
MSK Master Session Key
MTC Machine-Type Communications
NAI Network Access Identifier
NF Network Function
NFC Near-Field Communication
NR New Radio
NSI Network Specific Identifier
PLMN Public Land Mobile Network
RAN Radio Access Network
RAT Radio Access Technology
SBA Service-Based Architecture
SEAF Security Anchor Function
SIM Subscriber Identity Module
SUCI Subscriber Concealed Identifier
SUPI Subscriber Permanent Identifier
TLS Transport Layer Security
UDM Universal Data Management
UE User Equipment
UI User Interface
VNF Virtual Network Function
WCDMA Wideband Code Division Multiple Access
WLAN Wireless Local Area Network
WiMAX Worldwide Interoperability for Microwave Access

| REFERENCE SIGNS LIST | |
|---|---|
| 100 | Onboarding network |
| 110 | UE |
| 115 | Air interface |
| 120 | BS |
| 125, 135 | Wired interface |
| 130 | Core network |
| 132 | SEAF |
| 134 | AUSF |
| 202-220 | Steps of the signaling graph of FIG. 2 |
| 300-370 | Structure of the apparatus of FIG. 3 |
| 410-420 | Phases of the first method in FIG. 4 |
| 510-520 | Phases of the second method in FIG. 5 |

What is claimed is:

1. An apparatus comprising at least one processor; and at least one memory including computer program code; the at least one memory and the computer program code configured to, with the at least one processor, cause the apparatus at least to:
   transmit, by a user equipment, a concealed identifier of the user equipment to an onboarding network, wherein the concealed identifier of the user equipment indicates that the user equipment is requesting unauthenticated access to the onboarding network;
   set a type of a permanent identifier in the concealed identifier as a network specific identifier and a home network identifier in the concealed identifier as a string reserved for unauthenticated access; and
   execute, by the user equipment, a key generating authentication protocol to access the onboarding network without performing authentication of the user equipment.

2. The apparatus according to claim 1, wherein the apparatus is further configured to:
   execute the authentication protocol to register the user equipment to the onboarding network without having a subscriber profile of the user equipment for accessing the onboarding network.

3. The apparatus according to claim 1, wherein the apparatus is further configured to:
   construct the concealed identifier of the user equipment to be usable for determining that unauthenticated access to the onboarding network is requested.

4. The apparatus according to claim 1, wherein the apparatus is further configured to:
   calculate at least one security key of a cellular communication system using a string reserved for unauthenticated access instead of a permanent identifier of the user equipment.

5. The apparatus according to claim 1, wherein the apparatus is further configured to:
   set a home network identifier in the concealed identifier as an identifier of the onboarding network and a scheme output as a string reserved for unauthenticated access.

6. The apparatus according to claim 1, wherein the apparatus is further configured to:
   set a type of a permanent identifier in the concealed identifier as a value reserved for unauthenticated access.

7. The apparatus according to claim 1, wherein the concealed identifier of the user equipment is a Subscription Concealed Identifier, SUCI, and/or a permanent identifier in the concealed identifier is a Subscription Permanent Identifier, SUPI.

8. The apparatus according to claim 7, wherein the SUPI is temporary.

9. The apparatus according to claim 8, wherein the apparatus is further configured to:
   calculate at least one security key of a cellular communication system using a value reserved for unauthenticated access instead of the temporary SUPI.

10. The apparatus according to claim 9, wherein the apparatus is further configured to:
    generate the temporary SUPI using a random string; and
    set a home network identifier in the concealed identifier as the temporary SUPI.

11. The apparatus according to claim 1, wherein the authentication protocol is a protocol which does not require authentication of the user equipment.

12. An apparatus comprising at least one processor; and at least one memory including computer program code; the at least one memory and the computer program code configured to, with the at least one processor, cause the apparatus at least to:
    receive, by an authentication server function of a network, an authentication request from a security anchor function of the network, the authentication request comprising a concealed identifier of a user equipment, wherein the concealed identifier of the user equipment indicates that the user equipment is requesting unauthenticated access to the network, the network being an onboarding network for the user equipment;

set, upon executing the authentication protocol, a permanent identifier of the user equipment in an authentication response as a string reserved for unauthenticated access to indicate that the user equipment has not been authenticated;

transmit the authentication response to the security anchor function; and execute, by the authentication server function, a key generating authentication protocol with the user equipment without performing authentication of the user equipment.

13. The apparatus according to claim 12, wherein the apparatus is further configured to:

execute the authentication protocol to register the user equipment to the onboarding network without having a subscriber profile of the user equipment for accessing to the onboarding network.

14. The apparatus according to claim 12, wherein the apparatus is further configured to:

determine, based on the concealed identifier, that unauthenticated access to the onboarding network is requested.

15. The apparatus according to claim 12, wherein the apparatus is further configured to:

select, based on the concealed identifier, the authentication protocol which does not require authentication of the user equipment for onboarding of the user equipment.

16. A method comprising:

transmitting, by a user equipment, a concealed identifier of the user equipment to an onboarding network, wherein the concealed identifier of the user equipment indicates that the user equipment is requesting unauthenticated access to the onboarding network;

set a type of a permanent identifier in the concealed identifier as a network specific identifier and a home network identifier in the concealed identifier as a string reserved for unauthenticated access; and executing, by the user equipment, a key generating authentication protocol to access the onboarding network without performing authentication of the user equipment.

17. The method according to claim 16, further comprising execute the authentication protocol to register the user equipment to the onboarding network without having a subscriber profile of the user equipment for accessing the onboarding network.

18. The method according to claim 16, further comprising construct the concealed identifier of the user equipment to be usable for determining that unauthenticated access to the onboarding network is requested.

19. The method according to claim 16, further comprising calculate at least one security key of a cellular communication system using a string reserved for unauthenticated access instead of a permanent identifier of the user equipment.

20. The method according to claim 16, further comprising set a home network identifier in the concealed identifier as an identifier of the onboarding network and a scheme output as a string reserved for unauthenticated access.

* * * * *